United States Patent Office 2,914,478
Patented Nov. 24, 1959

2,914,478
ANTIRUST COMPOSITION

Loren L. Neff, Fullerton, Calif., assignor to Union Oil Company of California, Los Angeles, Calif., a corporation of California No Drawing. Application September 28, 1953
Serial No. 382,853

12 Claims. (Cl. 252—46.6)

This invention relates to new compositions of matter consisting of the reaction product obtained by reacting a diester of a thiophosphoric acid with an olefin oxide and to methods for their preparation. More particularly, the invention relates to the esters obtained by reacting an olefin oxide with a diester of thiophosphoric acid. The resulting reaction products or esters are non-acidic oil-soluble compounds which when added to mineral lubricating oils or even lighter petroleum fractions, e.g., transformer oil or spray oil fractions, in combination with auxiliary compounds such as sulfonates, etc. impart rust-preventive and corrosion inhibiting characteristics to such petroleum fractions or lubricating oils. Moreover, the lower molecular weight compounds, i.e., those in which the hydrocarbon substituents of the thiophosphoric acids are of relatively low carbon atom content, have value as flotation agents, surface active agents, wetting agents and the like. The invention relates also to hydrocarbon oil compositions containing the resulting reaction products and more particularly to oils containing the reaction products together with auxiliary agents, which oil compositions have antirust and corrosion inhibiting characteristics. Such compositions are useful as rust-preventive lubricants and oil compositions suitable for use in protecting metal parts and the like.

Thus, it is an object of this invention to produce by relatively simple means triesters of thiophosphoric acids from the diesters and more particularly to produce oil soluble triesters of dithiophosphoric acid dioxyesters.

Another object of the invention is to provide rust prevention and anticorrosion compositions consisting essentially of mineral oil containing oil-soluble triesters of dithiophosphoric acid together with an auxiliary agent, which combination of additives imparts the mentioned characteristics to the compositions.

A further object of the invention is to provide a method of converting diesters of thiophosphoric acid into their triesters.

The esters of this invention, which in fact are triesters, are prepared by reacting a diester of a thiophosphoric acid and preferably a dithiophosphoric acid with an organic epoxy compound. The preparation of these esters is illustrated by the reaction of the di-normal butyl dithiophosphoric acid with propylene oxide to yield the corresponding triester which may be described as S-(2-hydroxyl propyl)-O,O-di-normal butyl dithiophosphate. The di-normal butyl dithiophosphoric acid may be prepared by reacting normal butanol with phosphorus penta sulfide. The preparation of this diester of dithiophosphoric acid and related esters is well known in the art and need not be described. It might be pointed out, however, that the reaction product of $P_2S_5$ and a hydroxy compound, such as an alcohol, results in the production of a diester with little, if any, triester. The product is always acidic due to the presence of the following grouping

When these acidic diester products are reacted with epoxy compounds under the conditions described herein a triester is produced, the reaction occurring at the —SH group. The resulting ester group contains a hydroxyl group.

In preparing the hydroxyl propyl ester referred to above, propylene oxide is added slowly, with continuous stirring, to the di-normal butyl dithiophosphoric acid, and during the addition the temperature is maintained between about 30–35° C. Cooling is necessary since the reaction is exothermic. When approximately one equivalent of propylene oxide has been added, it is observed that further reaction does not take place as indicated by the fact that the temperature of the reaction mixture decreases. At this point the reaction mixture is heated and maintained at 65–70° C., with stirring, for one hour and then dissolved in a light hydrocarbon solvent having a boiling point range of about 50° C. to about 100° C. The resulting naphtha solution is washed with water and then evaporated by heating to 105° C. with fuel gas or steam stripping. This product is oil-soluble and when dissolved in mineral lubricating oil imparts anticorrosion characteristics to the oil, as indicated by bearing weight losses of copper-lead bearings used in internal combustion engines, and imparts rust-preventive characteristics to lubricating oils and light petroleum oils as indicated by rusting tests carried out in a humidity cabinet on mild steel panels. The methods of carrying out the engine tests and humidity cabinet tests will be described hereinbelow.

The method of preparing the esters of this invention is substantially the same regardless of the epoxy compound employed and regardless of the diester of dithiophosphoric acid employed in the reaction. Although catalysts may be employed, as for example, small amounts of sodium hydroxide or the like, catalytic agents are not necessary. In general, normally gaseous epoxy compounds are bubbled into the diester of thiophosphoric acid to be employed. In the case of normally liquid epoxy compounds, the compound in liquid form is added slowly during the progress of the reaction. The temperature at which the reaction occurs is preferably maintained between about 25° C. and 35–40° C., particularly for the lower boiling epoxides, although the reaction may be effected at temperatures as high as about 200° C. The higher temperatures are not necessary and tend to produce products of darker color than those obtained with lower reaction temperatures. The reaction may be effected at ordinary pressures or superatmospheric pressures, such as pressures up to 100 pounds gage or even higher. Operating under the conditions indicated most epoxy compounds and diesters of dithiophosphoric acids react in substantially equal molar ratios to produce the corresponding triesters.

Organic epoxy compounds which may be employed are preferably the lower olefin oxides and particularly ethylene oxide and propylene oxide. However, the higher alkylene oxides, as for example, the butylene oxides and higher oxides, may be employed. Other epoxy compounds which may be used and which react under the same conditions described above include styrene oxide, epichlorohydrin, glycidol and similar compounds. Thus, epoxy compounds which may be employed include those compounds containing the group

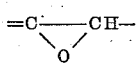

where the remaining valences of the carbon atoms are satisfied by hydrogen, or organic radicals, preferably hydrocarbon radicals, e.g., alkyl, cycloalkyl, aryl, aralkyl or alkaryl radicals.

The preferred epoxy compounds are those containing the group

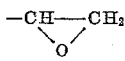

where the remaining valence of carbon is satisfied with hydrogen or with an alkyl group containing between 1 and about 6 or 8 carbon atoms. These compounds are generally referred to as 1,2-olefin oxides and include in addition to ethylene oxide and propylene oxide mentioned, the 1,2-epoxy butane, 1,2-epoxy pentane, 1,2-epoxy-3-methylbutane, 1,2-epoxy hexanes, e.g., 1,2-epoxy-3-methylpentane and the various 1,2-epoxy heptanes and octanes. The corresponding compounds in which the oxygen is in the 2,3-position or the 3,4-position, as in the case of epoxy octane, and compounds such as 1,2-epoxy isobutane and other compounds having two alkyl radicals attached to one of the carbon atoms which is in turn attached to oxygen are included in the broader group of olefin oxides which are preferred as the epoxy compounds to be employed in preparing the triesters of this invention.

The diesters of thiophosphoric acid which may be employed include the dialkyl, diaryl, dicycloalkyl, diaralkyl, and dialkaryl esters. Also, it is not necessary that the two ester groups be the same. Thus, mixed ester, such as an alkylaryl ester may be employed. The preferred esters are the O-O diesters of dithiophosphoric acid which are obtained by reacting phosphorus penta sulfide with the corresponding hydroxy compounds, as for example, aliphatic alcohols, phenols, cycloalkyl alcohols and the like. It is also possible to prepare diesters of thiophosphoric acids by reacting phosphorus penta sulfide with mercaptans in place of hydroxy compounds. The resulting esters contain a higher proportion of sulfur linkages and thus may consist of tri or tetra thiophosphoric acid derivatives. Thus, the diesters of thiophosphoric acid which may be used to react with the epoxy compounds include those compounds represented by the formula

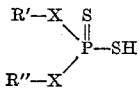

in which X represents oxygen or sulfur and R' and R" may be the same or different and represent hydrocarbon radicals selected from the group of alkyl, cycloalkyl, aryl, aralkyl and alkaryl radicals.

It is obvious that when the above diesters are reacted with the above epoxy compounds according to the well known addition type of reaction of such epoxy compounds and compounds containing an active hydrogen, as illustrated by the preparation of S-(2-hydroxyl propyl)-O,O-di-normal butyl dithiophosphate described above, the triester products will have the corresponding general formula:

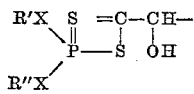

where R', R", X and the remaining valences of the carbon atoms have the same significance as in the preceding formulas.

The triesters of this invention have particular utility in preparing anticorrosive mineral lubricating oils as well as in preparing rust preventive compositions. Thus, a mineral lubricating oil containing from 0.1% to 3 or 4% by weight of the triester is found to greatly reduce bearing weight loss when employed in crankcases of internal combustion engines. This particular anticorrosion effect is observed by determining the weight loss of corrosion sensitive bearings, as for example, copper-lead bearings. The triesters may be used alone in such oils or they may be employed in conjunction with between about 0.2% to 4 or 5% by weight of metal petroleum sulfonates, which act as detergents in such compositions, or in fact, other detergent additives, as for example, metal salts of rosin or hydrogenated rosin acids, metal salts of substituted fatty acids, as for example, dichlorostearic acid, phenyl stearic acid and the like. Also, between about 0.2% and 5% of antioxidants, antiwear agents and the like may be included in the compositions. Thus, mineral lubricating oils may be prepared which contain the triesters of this invention alone or with metal sulfonate and/or other agent, as for example, polyvalent metal dithiophosphates, oil-soluble metal phenates, phenyl sulfides, weak non-carboxylic acid salts and other similar metals well known in the art.

Another use of the triesters of this invention is in the production of antirust compositions. Such antirust compositions will consist essentially of a mineral oil fraction, ranging from light petroleum thinners to fractions in the heavy lubricating oil range, containing from 0.1% to 3 or 4% by weight of the triester of this invention together with from 0.1% to 3 or 4% by weight of a metal petroleum sulfonate and particularly an alkali metal petroleum sulfonate or with a sorbitan ester of a long chain fatty acid, such as sorbitan monooleate, sorbitan trioleate, sorbitan stearate and the like. Antirust compositions of this type are used for protecting metal parts from rusting and these antirust agents have been evaluated in a humidity cabinet as described hereinbelow. In this use, it is to be noted that the addition of triester alone does not impart any appreciable antirust characteristics. Moreover, it is observed that the addition of metal sulfonates or sorbitan esters alone to mineral oil fractions does not impart any appreciable protection against rusting. However, when the combination of triester with metal sulfonate or with sorbitan ester is employed, the atirust properties of the composition are found to be exceptional and far greater than could be anticipated by the results of tests on the additives employed separately. This effect is shown in the examples presented herein. Apparently there is a synergistic action between the triesters and metal petroleum sulfonates and/or sorbintan esters, which results in an unexpected increase in protection against rusting of ferrous metals.

Metals to be employed in the preparation of metal sulfonates useful in both the anticorrosive lubricating oil and the antirust compositions include the alkaline earth metals, calcium, barium, strontium and magnesium; the alkali metals, sodium, lithium and potassium; as well as the heavy metals, as for example, lead, zinc, tin and the like. For use in preparing antirust compositions, the alkali metal petroleum sulfonates appear to have the greatest synergistic action when used with the triesters of this invention and thus are the preferred metals to be employed.

Tests to determine antirust characteristics of compositions containing the esters of this invention have been run in a humidity cabinet under conditions specified in the Air Force-Navy-Aeronautical Specification AN-VV-C-576b. In this test, sand blasted mild steel panels measuring 2 inches by 4 inches by 1/16 inch are dipped in the composition to be tested, permitted to drain for four hours and then placed in a cabinet referred to as a humidity cabinet, which is maintained at 120° F. Air is bubbled through water contained in the bottom of the cabinet so that the relative humidity within the cabinet is approximately 100%. Failure of a given composition is considered to be that time at which rust spots develop on the surface of the test panel. If more than three minute rust spots appear or if a single spot of 1 mm. in diameter appears, the composition is said to fail.

Anticorrosion characteristics of the compositions of this invention have been determined in a Lauson test engine. In carrying out the Lauson engine test, the engine is operated for a total of 60 hours under a load of about 3.5 h.p. with a coolant temperature of about 295° F. and an oil temperature of about 280° F. Following the test run and in some cases, after 20, 40 and 60 hours of operation during the test, the bearings are removed and weighed in order to determine the so-called bearing weight loss. The bearings used are the corrosion-sensitive copper-lead bearings.

The following examples will illustrate the method of preparing the triesters of thiophosphoric acid and the usefulness of these esters in rust preventive and anticorrosion compositions.

*Example I*

To 200 grams of di-n-butyl dithiophosphoric acid was added a total of 70 ml. of propylene oxide. The oxide was added dropwise over a period of about 75 minutes while agitating the reaction mixture and cooling the mixture to maintain a reaction temperature at 30–33° C. Following completion of the reaction as indicated by a drop in temperature of the reaction mixture without external cooling, the mixture was heated to 65–70° C. for 1 hour.

The reaction product was dissolved in a petroleum naphtha having a boiling range of about 60° C. to 100° C. and washed with water. Following the washing, the product was evaporated and steam stripped at 105° C. to remove solvent. This triester product will be referred to hereinafter as product A.

Product A was dissolved in a solvent treated Western paraffinic mineral oil having an SU viscosity at 210° F. of 120 seconds in order to test its antirust characteristics. The following table shows the effect of 1% by weight of the triester alone and in combination with auxiliary agents, and also the effect of the auxiliary agents by themselves in protecting sand blasted steel panels in the humidity cabinet test. For further comparison the test result on the base oil by itself is given. The results readily show great improvement resulting from the inclusion of the triester together with sulfonate or sorbitan ester.

| Oil No. | Composition | Days to Failure in Humidity Cabinet |
|---|---|---|
| 1 | Base Oil | 0.05 (approx.). |
| 2 | Base Oil + 1% Product A | 0.05 (approx.). |
| 3 | Base Oil + 1% sodium petroleum sulfonate | 0.8. |
| 4 | Oil No. 3 + 1% Product A | 6.8. |
| 5 | Base Oil + 1% sorbitan monooleate | 0.8. |
| 6 | Oil No. 5 + 1% Product A | 3.8. |

A lubricating oil was prepared by dissolving 1% by weight of product A in an SAE 30 solvent-treated Western paraffinic mineral lubricating oil. Lauson engine tests were made on this oil and on the base oil to determine the effectiveness of the triester in preventing corrosion in an engine. The results of this test are shown in the following table:

| Composition | Cu-Pb Bearing Weight Loss, Mgs. | | |
|---|---|---|---|
| | 20 hours | 40 hours | 60 hours |
| Base Oil: | | | |
| Test 1 | 93 | 449 | 597 |
| Test 2 | 81 | 441 | 722 |
| Base Oil + 1.0 wt. percent Product A | 22 | 31 | 38 |
| Base Oil + 1.0 wt. percent Product A and 0.21% SO₄ ash from calcium petroleum sulfonate | 32 | 62 | 80 |

*Example II*

To 270 grams of diamyl dithiophosphoric acid was added 80 grams of butylene oxide. The butylene oxide was added dropwise over a period of about one hour while agitating the reaction mixture and cooling the mixture to maintain a reaction temperature between about 45° C. and 50° C. Following the addition, the temperature of the reaction mixture was increased to approximately 75° C. for one hour.

The reaction product was dissolved in a petroleum naphtha, washed with water and then evaporated and steam stripped to 110° C. to remove water and solvent. The resulting triester product will be referred to hereinafter as product B.

Product B was used in the preparation of several rust preventive oils using a viscous mineral lubricating oil as the base. Compositions and tests on the oils produced are as shown in the following table.

| Oil No. | Composition | Days to Failure in Humidity Cabinet |
|---|---|---|
| 1 | Base Oil (Same as Example I) | 0.05 (approx.). |
| 2 | Base Oil + 1% Product B | 0.05 (approx.). |
| 3 | Oil No. 2 + 1% Na petroleum sulfonate | 7.0. |
| 4 | Oil No. 2 + 1% Ca petroleum sulfonate | 6.5. |
| 5 | Oil No. 2 + 1% sorbitan monooleate | 4.0. |

A lubricating oil containing 1% by weight of product B in an SAE 30 solvent treated Western paraffinic mineral lubricating oil showed a bearing weight loss at 60 hours in the Lauson engine test of 40 mg.

*Example III*

A 350 gram portion of di-2-ethylhexyl dithiophosphoric acid was maintained at a temperature of about 32° C. by means of external cooling while bubbling ethylene oxide into the acid. The addition of ethylene oxide was continued until the tendency for the reaction temperature to increase ceased. Following this treatment which required approximately one hour, the mixture was heated for an additional 30 minutes at 65° C. The resulting reaction product was dissolved in a petroleum naphtha, washed with water and then evaporated and steam stripped to remove solvent and water. The resulting triester will be referred to hereinafter as product C.

This product was dissolved in a mineral lubricating oil of the type described in Example I alone and together with auxiliary agents. The following table shows the compositions of oils produced and tests on the oils.

| Oil No. | Composition | Days to Failure in Humidity Cabinet |
|---|---|---|
| 1 | Base Oil (Same as Example I) | 0.05 (approx.). |
| 2 | Base Oil + 1% Product C | 0.05 (approx.). |
| 3 | Oil No. 2 + 1% Na petroleum sulfonate | 6.7. |
| 4 | Oil No. 2 + 1% sorbitan monooleate | 4.0. |
| 5 | Oil No. 2 + 0.5% sorbitan stearate | 3.0. |

*Example IV*

Following the procedure outlined in Example II, a triester was prepared by reacting approximately 200 grams of di-n-butyl dithiophosphoric acid with 120 grams of styrene oxide. The product, after water washing and stripping, which will be referred to as product D, was used in the preparation of the following oils which were tested with the results shown in the following table. The base oil was the same as that employed in Example I.

| Oil No. | Composition | Days to Failure in Humidity Cabinet |
|---|---|---|
| 1 | Base Oil + 1% Product D | 0.05 (approx.). |
| 2 | Oil No. 1 + 1% Na petroleum sulfonate | 7.0. |
| 3 | Oil No. 1 + 0.5% Ca petroleum sulfonate | 6.0. |
| 4 | Oil No. 1 + 2% sorbitan monooleate | 4.8. |
| 5 | Oil No. 1 + 1% sorbitan trioleate | 4.0. |

The above examples are merely illustrative and it is to be understood that other dithiophosphoric acid disclosed herein may be reacted with other epoxy compounds which are disclosed to produce diesters having the rust inhibiting and anticorrosion characteristics of those specifically disclosed in the examples. Moreover, it is to be understood that other auxiliary agents may be employed with the triesters set forth to produce similar effects.

I claim:
1. A composition for protecting ferrous metal surfaces against rusting consisting essentially of a hydrocarbon oil fraction containing between about 0.1% and about 4% by weight of a triester of thiophosphoric acid having the formula

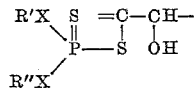

where R' and R" are hydrocarbon radicals and X is an element selected from the group consisting of oxygen and sulfur and the remaining valences of the carbon atoms are satisfied by radicals selected from the group consisting of hydrogen and hydrocarbon radicals, and between about 0.1% and about 4% by weight of a sorbitan ester of a long chain fatty acid.

2. The composition according to claim 1 in which said sorbitan ester is sorbitan monooleate.

3. The composition according to claim 1 in which the radicals satisfying the remaining groups are two hydrogen radicals and one methyl radical.

4. The composition according to claim 1 in which the

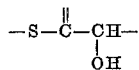

radical is from ethylene oxide.

5. The composition according to claim 1 in which the

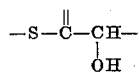

radical is from propylene oxide.

6. The composition according to claim 1 in which the triester consists essentially of S-(2-hydroxyl propyl)-O,O-di-normal butyl dithiophosphate.

7. A method of protecting ferrous metal surfaces against rusting which comprises applying thereto a film consisting essentially of a hydrocarbon oil containing between about 0.1% and about 4% by weight of a triester of thiophosphoric acid having the formula

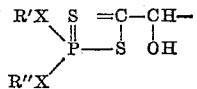

where R' and R" are hydrocarbon radicals and X is an element selected from the group consisting of oxygen and sulfur and the remaining valences of the carbon atoms are satisfied by radicals selected from the group consisting of hydrogen and hydrocarbon radicals, and between about 0.1% and about 4% by weight of a sorbitan ester of a long chain fatty acid.

8. The method according to claim 7 in which the sorbitan ester is sorbitan monooleate.

9. The method according to claim 7 in which the radicals satisfying the remaining groups are two hydrogen radicals and one methyl radical.

10. The method according to claim 7 in which the

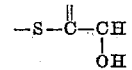

radical is from ethylene oxide.

11. The method according to claim 7 in which the

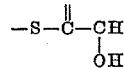

radical is from propylene oxide.

12. The method according to claim 7 in which the triester consists essentially of S-(2-hydroxyl propyl)-O,O-di-normal butyl dithiophosphate.

References Cited in the file of this patent
UNITED STATES PATENTS

| | | |
|---|---|---|
| 2,125,305 | Murphy | Aug. 2, 1938 |
| 2,479,424 | Sproule et al. | Apr. 16, 1949 |
| 2,531,129 | Hook et al. | Nov. 21, 1950 |
| 2,783,204 | McDermott | Feb. 26, 1957 |